(12) United States Patent
Koifman et al.

(10) Patent No.: US 9,289,836 B2
(45) Date of Patent: Mar. 22, 2016

(54) DOUBLE-SIDED INDEXABLE CUTTING INSERT AND CUTTING TOOL THEREFOR

(71) Applicant: Iscar, Ltd., Tefen (IL)

(72) Inventors: Alexander Koifman, Kfar Vradim (IL); Alexander Passov, Haifa (IL); Alexander Bronshteyn, Nahariya (IL); Yanina Kunitsa, Carmiel (IL)

(73) Assignee: Iscar, Ltd., Tefen (IL)

( * ) Notice: Subject to any disclaimer, the term of this patent is extended or adjusted under 35 U.S.C. 154(b) by 338 days.

(21) Appl. No.: 14/151,629

(22) Filed: Jan. 9, 2014

(65) Prior Publication Data

US 2015/0190868 A1 Jul. 9, 2015

(51) Int. Cl.
- *B23C 5/20* (2006.01)
- *B23C 5/22* (2006.01)
- *B23C 5/28* (2006.01)
- *B23C 5/06* (2006.01)

(52) U.S. Cl.
CPC . *B23C 5/207* (2013.01); *B23C 5/06* (2013.01); *B23C 5/205* (2013.01); *B23C 5/2217* (2013.01); *B23C 5/2221* (2013.01); *B23C 5/28* (2013.01); *B23C 2200/0411* (2013.01); *B23C 2200/0477* (2013.01); *B23C 2200/08* (2013.01); *B23C 2200/123* (2013.01); *B23C 2200/361* (2013.01); *B23C 2210/084* (2013.01); *B23C 2250/12* (2013.01); *Y10T 407/14* (2015.01); *Y10T 407/192* (2015.01); *Y10T 407/1908* (2015.01); *Y10T 407/23* (2015.01); *Y10T 407/235* (2015.01)

(58) Field of Classification Search
CPC .. B23C 5/207; B23C 5/20; B23C 2200/0472; B23C 2200/208; B23C 2200/16; B23C 2200/0477

See application file for complete search history.

(56) References Cited

U.S. PATENT DOCUMENTS

| 3,229,349 A | 1/1966 | Leksell |
| 4,880,338 A | 11/1989 | Stashko |

(Continued)

FOREIGN PATENT DOCUMENTS

| WO | 2009/121459 | 10/2009 |
| WO | 2012/147923 | 11/2012 |
| WO | 2012/147924 | 11/2012 |

OTHER PUBLICATIONS

International search report dated Apr. 15, 2015 issued in PCT counterpart application (No. PCT/IL2014/051093).

*Primary Examiner* — Sunil K Singh
*Assistant Examiner* — Alan Snyder
(74) *Attorney, Agent, or Firm* — Womble Carlyle Sandridge & Rice PLLC (57) ABSTRACT

A cutting insert having two end surfaces and a peripheral surface, the end surfaces located on opposite sides of a mid-plane, each end surface having three primary apexes and three secondary apexes. Six cutting portions are formed along the intersection of the peripheral surface and the end surfaces. Each cutting portion has a first cutting edge and a second cutting edge extending transversely thereto. A ramping cutting edge extends between the second cutting edge of each cutting portion and the first cutting edge of an adjacent cutting portion. The peripheral surface has a clearance surface extending from each of the second cutting edges towards the mid-plane. The abutment planes of the insert are parallel to the mid-plane. Each of the first cutting edges lies between an adjacent abutment plane and adjacent primary apex.

23 Claims, 5 Drawing Sheets

(56) References Cited

U.S. PATENT DOCUMENTS

| | | |
|---|---|---|
| 7,455,483 B2 | 11/2008 | Koskinen |
| 8,177,460 B2 | 5/2012 | Satran et al. |
| 2007/0292219 A1* | 12/2007 | Craig .................... B23C 5/207 407/48 |
| 2014/0126974 A1 | 5/2014 | Koga |
| 2014/0314509 A1 | 10/2014 | Yamamichi |

* cited by examiner

DOUBLE-SIDED INDEXABLE CUTTING INSERT AND CUTTING TOOL THEREFOR

FIELD OF THE INVENTION

The present invention relates to indexable cutting inserts and cutting tools therefor, in general, and to double-sided indexable cutting inserts with six cutting portions and cutting tools therefor, in particular.

BACKGROUND OF THE INVENTION

Metal cutting tools such as milling cutters, slotting cutters and saws have a plurality of cutting inserts retained on the peripheral surface of the tool body. The cutting inserts may have multiple cutting edges, and each insert may be reversible (i.e., double-sided) and indexable to use another cutting edge when a certain cutting edge is worn or damaged. The indexable cutting inserts may have a plurality of cutting corners on each side of the insert, adapted for cutting metal at predetermined positioning.

The cutting tool body has respective insert retaining pockets suitable for receiving the cutting inserts, and retaining them during metal cutting operations. Cutting inserts and cutting tools as described above are shown, for example, in U.S. Pat. No. 3,229,349, U.S. Pat. No. 4,880,338, U.S. Pat. No. 7,455,483, U.S. Pat. No. 8,177,460, WO2009/121459, WO2012/147924 and WO2012/147923.

It is an object of the present invention to provide a novel double sided indexable cutting insert and cutting tool, for milling operations, where the cutting insert having six cutting portions.

SUMMARY OF THE INVENTION

In accordance with the subject matter of the present application, there is provided a double sided indexable cutting insert having a central insert axis extending perpendicular to an insert mid-plane, and comprising:
  two end surfaces and a peripheral surface extending therebetween, the end surfaces located on opposite sides of the mid-plane, each end surface having three primary apexes and three secondary apexes; and
  six cutting portions, each formed along the intersection of the peripheral surface and one of the end surfaces at each primary apex, each cutting portion comprising a first cutting edge and a second cutting edge extending transversely to the first cutting edge, and a tip cutting edge extending therebetween;
  wherein:
  the peripheral surface has a plurality of clearance surfaces, each extending from one of the second cutting edges in the direction of the mid-plane,
  each of the first cutting edges has a major portion extending from the respective tip cutting edge towards the mid-plane, and a curved portion extending from the major portion and curving away from the mid-plane,
  each end surface has an insert abutment surface on an abutment plane, the abutment planes being parallel to the mid-plane and equidistant therefrom, and
  each of the curved portions lies between an adjacent abutment plane and an adjacent primary apex, in a direction along the central insert axis.

In accordance with another embodiment of the subject matter of the present application, there is provided a cutting tool having a rotation axis, and comprising:
  a tool body having a plurality of insert pockets formed on the periphery thereof arranged symmetrically about the rotation axis; and
  a plurality of cutting inserts as described above, retained in the insert pockets.

In accordance with a further embodiment of the present invention, there is provided a cutting tool, as described above, wherein:
  each of the end surfaces of the cutting insert has three abutment recesses, each formed adjacent to one of the secondary apexes, between the secondary apex and the insert axis, and
  each pocket abutment surface has three spaced apart pocket recesses formed therein, each pocket recess at least partially overlapping with one of the abutment recesses.

In accordance with another embodiment of the subject matter of the present application, there is provided a cutting tool having a rotation axis, and comprising:
  a tool body having a plurality of insert pockets formed on the periphery thereof and arranged symmetrically about the rotation axis, each insert pocket having a pocket abutment surface with a plurality of spaced apart pocket recesses, and a plurality of clamping walls extending transversely to the pocket abutment surface; and
  a plurality of cutting inserts retained in the insert pockets, each cutting insert comprising two opposite end surfaces and a peripheral surface extending therebetween, the peripheral surface having a plurality of side flanks, and each end surface having an insert abutment surface with a plurality of spaced apart abutment recesses,
  wherein:
  the side flanks of the cutting insert abut the respective clamping walls, and one of the insert abutment surfaces of each cutting insert abuts the respective pocket abutment surface with each pocket recess at least partially overlapping with one of the abutment recesses.

In accordance with yet a further embodiment of the subject matter of the present application, there is provided a cutting tool having a rotation axis, and comprising:
  a tool body having a plurality of insert pockets formed on the periphery thereof arranged symmetrically about the rotation axis, each insert pocket having a pocket abutment surface with a plurality of spaced apart pocket recesses, and a plurality of clamping walls extending transversely to the pocket abutment surface; and
  a plurality of cutting inserts retained in the insert pockets, each cutting insert comprising two opposite end surfaces and a peripheral surface extending therebetween, the peripheral surface having a plurality of side flanks, and each end surface having an insert abutment surface with a plurality of spaced apart abutment recesses,
  wherein:
  the side flanks of the cutting insert abut the respective clamping walls, and one of the insert abutment surfaces of each cutting insert abuts the respective pocket abutment surface with each pocket recess at least partially overlapping with one of the abutment recesses.

In accordance with yet another embodiment of the subject matter of the present application, there is provided a double sided indexable cutting insert having a central insert axis extending perpendicular to an insert mid-plane, and comprising:
  two end surfaces and a peripheral surface extending therebetween, the end surfaces located on opposite sides of the mid-plane, each end surface having three primary apexes and three secondary apexes; and six cutting portions, each formed along the intersection of the peripheral surface and one of the end surfaces, each cutting portion comprising a first cutting edge and a second cutting edge extending transversely to the first cutting edge, and a tip cutting edge extending therebetween, the tip cutting edge corresponding to a respective primary apex;

wherein:

each end surface has an insert abutment surface on an abutment plane, the abutment planes being parallel to the mid-plane and spaced apart therefrom by a first distance, the primary apexes on each end surface define a tip plane which is parallel to an associated adjacent abutment plane and spaced apart therefrom by a second distance;

the secondary apexes on each end surface define a corner plane parallel to an associated adjacent abutment plane and spaced apart therefrom by a third distance, with the third distance being smaller than the second distance;

the tip plane and the corner plane are both on the same side of their associated abutment plane; and a ratio of the third distance to the second distance is between 0.04 and 0.1.

BRIEF DESCRIPTION OF THE DRAWINGS

For a better understanding of the present invention and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well-known features may be omitted or simplified in order not to obscure the present invention.

Reference is now made to FIGS. 1-4, depicting a cutting tool 150 according to an embodiment of the present invention. The cutting tool 150 has a tool body 152 with a rotation axis R. The tool body 152 has a plurality of insert pockets 154 formed on the periphery thereof, the insert pockets 154 are arranged symmetrically about the rotation axis R. A plurality of cutting inserts 100 in accordance with the present invention, are retained in the insert pockets 154. Each cutting insert 100 is fastened to the respective insert pocket 154 with a clamping member 164 that passes through a clamping hole 130 in the cutting insert 100 and through a fastening hole 162 in the insert pocket 154.

Figure 5:
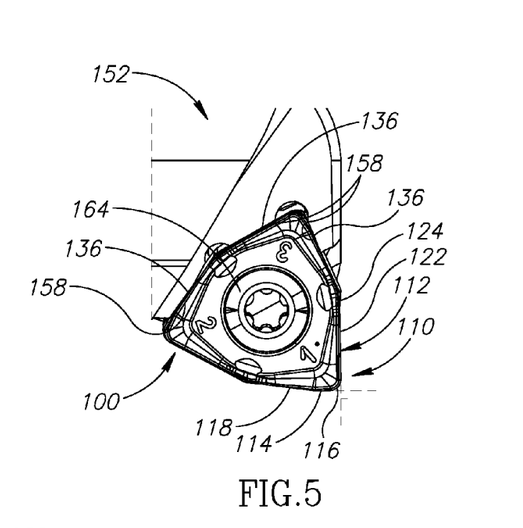
FIG. 5 is an enlarged view of a portion of the cutting tool of FIG. 1.
Figure 6:
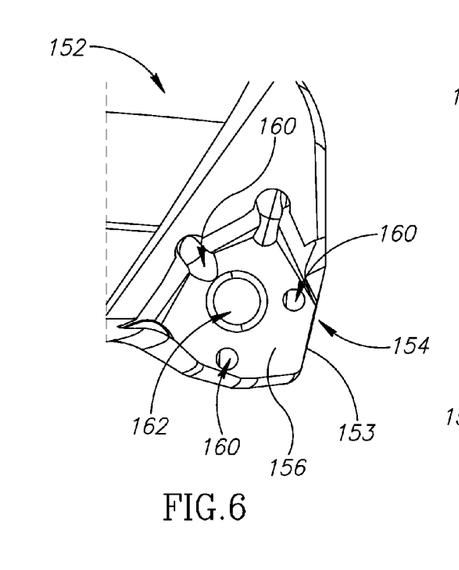
FIG. 6 is an enlarged front view of an insert pocket of the cutting tool of FIG. 1.
Figure 7:
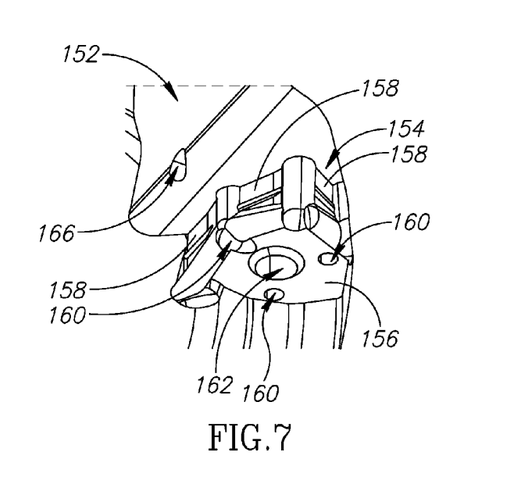
FIG. 7 is an enlarged perspective view of the insert pocket of FIG. 6.

With further reference to FIGS. 5-7, each insert pocket 154 has a pocket abutment surface 156 and a plurality of clamping walls 158 extending transversely to the pocket abutment surface 156. The fastening hole 162 extends transversely to the pocket abutment surface 156 and opens out thereto.

Reference is further made to FIGS. 8-14, depicting various views of the cutting insert 100 according to an embodiment of the present invention. The cutting insert 100 is a double sided indexable cutting insert 100 having a central insert axis A, and an insert mid-plane P, extending perpendicular to the insert axis A. The cutting insert 100 comprises two end surfaces 102 and a peripheral surface 104 extending therebetween. The intersection of the peripheral surface 104 with each of the two end surfaces 102, forms a pair of peripheral edges 103. The end surfaces 102 are located on opposite sides of the mid-plane P and rotationally symmetric to one another about the bisector B extending along the mid-plane P. Each end surface 102 has a trigon shape, with three primary apexes 106 and three secondary apexes 108, arranged alternatingly. The clamping hole 130 extends along the insert axis A, and opens out at least to one of the end surfaces 102. In the embodiment shown in the Figures, the clamping hole 130 is a through hole, opening out to both of the end surfaces 102.

The peripheral edges 103 of the cutting insert 100 define six cutting portions 110, each formed between the peripheral surface 104 and one of the end surfaces 102 at one of its primary apexes 106. Each cutting portion 110 comprises a first cutting edge 112 and a second cutting edge 114 extending transversely to the first cutting edge 112. A tip cutting edge 116 (i.e., corner cutting edge), corresponding to the primary apex 106, extends between the first and second cutting edges 112, 114, connecting the two edges. A ramping cutting edge 118 extends between the second cutting edge 114 of each cutting portion 110 and the first cutting edge 112 of an adjacent cutting portion 110.

The peripheral surface 104 has a plurality of clearance surfaces 120, each extending from one of the second cutting edges 114 in the direction of the mid-plane P. The clearance surfaces 120 typically terminate prior to the mid-plane P. Thus, each second cutting edge 114 is indented inwards from the peripheral surface 104. The peripheral surface 104 also has a plurality of relief surfaces 134, each extending along one of the cutting portions 110. Each relief surface 134 extends along the respective first cutting edge 112 and the tip cutting edge 116 towards the mid-plane P.

The peripheral surface 104 has six side flanks 136 formed thereon. Each side flank 136 extends between a pair of primary apexes 106 located on opposite sides of the mid-plane P, and an adjacent pair of secondary apexes 108 located on opposite sides of the mid-plane P. The side flanks 136 are planar and parallel to the insert axis A. At each primary apex 106, each pair of adjacent side flanks 136 forms a first acute angle α therebetween. This is indicated, for example, in the top view of FIG. 8. In some embodiments, the first acute angle α is in the range of 82°-86°, and in a particular embodiment, the first acute angle α is an 84° angle.

Each of the first cutting edges 112 has a major portion 122 extending from the respective tip cutting edge 116 towards the mid-plane P. In the embodiment shown in the accompanying figures, the major portion 122 extends substantially perpendicular to the second cutting edge 114 of the same cutting portion 110, enabling metal cutting of a substantially perpendicular corner in a work piece. Typically, the major portion 122 may lie at an angle of between 89°-91° to the second cutting edge 114 of the same cutting portion 110, e.g., due to manufacturing tolerances. In the embodiment shown in the Figures, the major portion 122 of the first cutting edge 112 is longer than the second cutting edge 114. In some embodiments the major portion 122 of the first cutting edge 112 may be constructed as a linear cutting edge. A curved portion 124 extends from the major portion 122, curving away from the mid-plane P. The ramping cutting edge 118 extends from the second cutting edge 114 of each cutting portion 110 towards the curved portion 124 of another cutting portion 110.

Figures 11, 12, 13, 14:
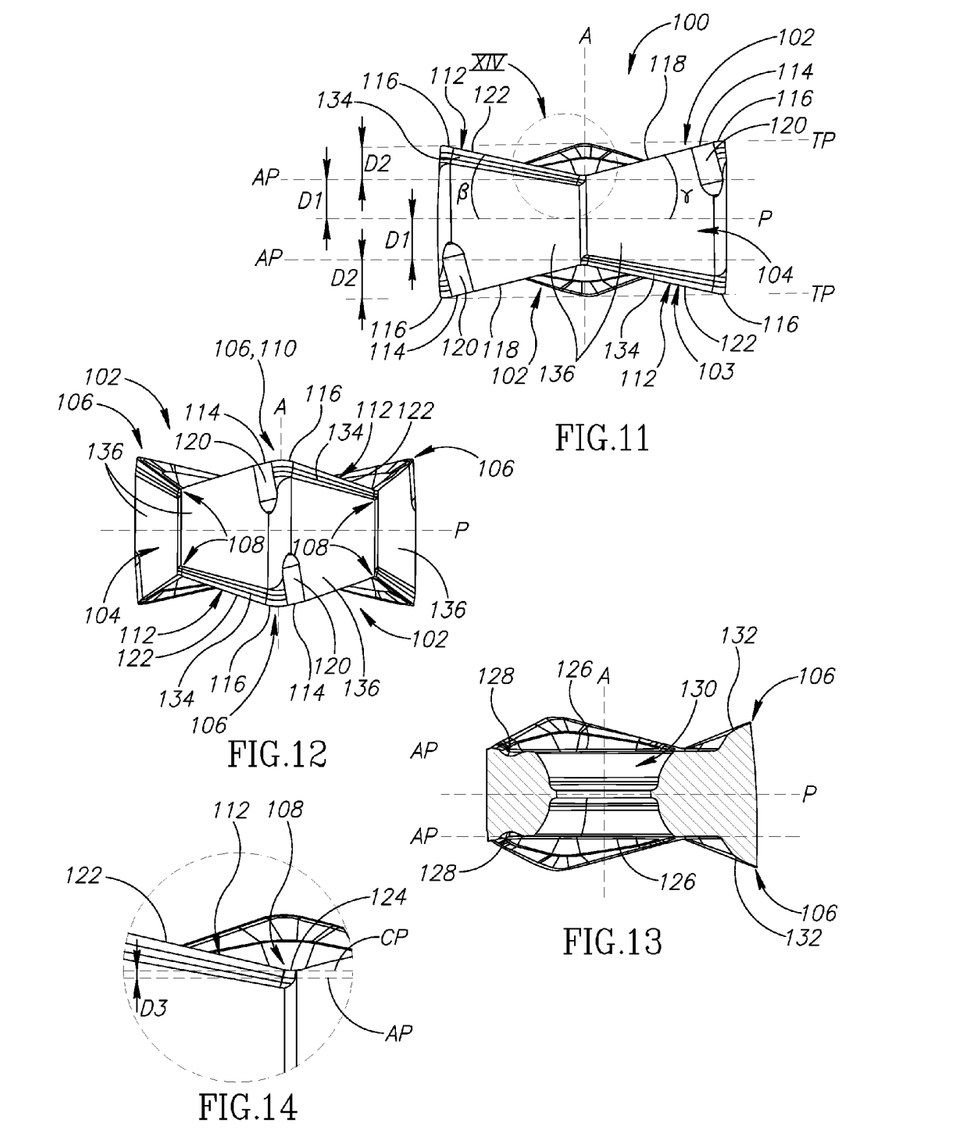
FIG. 11 is a first side view of the cutting insert of FIG. 8.
FIG. 12 is a second side view of the cutting insert of FIG. 8.
FIG. 13 is a cross section of the cutting insert of FIG. 8.
FIG. 14 is an enlarged view of a portion of the cutting insert of FIG. 8.

FIG. 11 depicts a side view of the cutting insert 100 taken along the mid-plane P and along a bisector B passing through one of the secondary apexes 108 and one of the primary apexes 106 (see FIG. 8), and viewed from the secondary apex 108. In this view, the major portion 122 of each of the first cutting edges 112 forms a second acute angle β with the mid-plane P. In some embodiments, the second acute angle β is in the range of 11° 44°, and in a particular embodiment, the second acute angle β is a 13° angle. As further shown in this side view, the ramping cutting edge 118 forms a third acute angle γ with the mid-plane P. The third acute angle γ is similar to the second acute angle β. In some embodiments, the third acute angle γ is in the range of 11° 44°, and in a particular embodiment, the third acute angle γ is a 13° angle. In addition, FIG. 12 depicts another side view of the cutting insert 100 taken along the mid-plane P and along a bisector B, viewed from the primary apex 106.

The ramping cutting edge 118 is operative during ramping operations on a metal work piece (e.g., ramp milling, helical interpolation, circular ramping, etc.), when the cutting tool 150 progresses along the rotation axis R (i.e., in the longitudinal direction, possibly in combination with other directions). The side flanks 136 thus place the respective ramping cutting edge 118 at a first acute angle α relative to the major portion 122 of the respective first cutting edge 112. In this manner, when the cutting insert 100 is engaged in a ramping operation, the ramping cutting edge 118 has sufficient clearance to cut metal chips from the surface of the work piece. This allows the cutting insert 100 to perform ramping operations on the metal work piece involving the ramping cutting edge 118, which would not have been possible if the angle α had been a non-acute angle. It would be appreciated that in non-ramping milling operations (e.g., face milling, shoulder milling, end milling, profile milling, turn milling, etc.), the ramping cutting edge 118 is non-operative, kept away from the work piece.

Each end surface 102 has an insert abutment surface 126 for abutting against the pocket abutment surface 156 of the insert pocket 154. Each insert abutment surface 126 has a respective abutment plane AP. The abutment planes AP of the insert abutment surfaces 126 are parallel to the mid-plane P and equidistant therefrom. Each abutment plane AP is located at a first distance D1 from the mid-plane P (see FIG. 11). As shown in particular in FIGS. 11 and 14, each abutment plane AP lies between the mid-plane P and the curved portions 124 of the respective first cutting edges 112, i.e., the first cutting edges 112 which are located on the same side of the mid-plane P as the abutment plane AP. In the embodiment shown, the entirety of each peripheral edge 103 is further from the mid-plane P than the abutment plane AP on the associated, respective side of the mid-plane P. Thus, it would be appreciated that the extension of the first cutting edge 112 turns away from the mid-plane P and the respective abutment plane AP, and does not intersect with the abutment plane AP. In other words, each of the curved portions 124 (and thus the entire first cutting edge 112), lies between an adjacent abutment plane AP and an adjacent primary apex 106, in a direction parallel to the central insert axis A.

At points farthest from mid-plane P, the primary apexes 106 on each end surface 102 define a tip plane TP which is parallel to an associated adjacent abutment plane AP and spaced apart therefrom by a second distance D2. At points closest to the mid-plane P, the secondary apexes 108 on each end surface 102 define a corner plane CP which is parallel to an associated adjacent abutment plane AP and spaced apart therefrom by a third distance D3, with the third distance D3 being smaller than the second distance D2 (i.e., D3<D2). The tip plane TP and the corner plane CP are both on the same side of their associated abutment plane AP. A ratio between the third distance D3 and the second distance D2 (i.e., D3:D2), is between 0.04 and 0.1. In a particularly preferred embodiment, the ratio D3:D2 is about 0.06.

Figures 8, 9, 10:
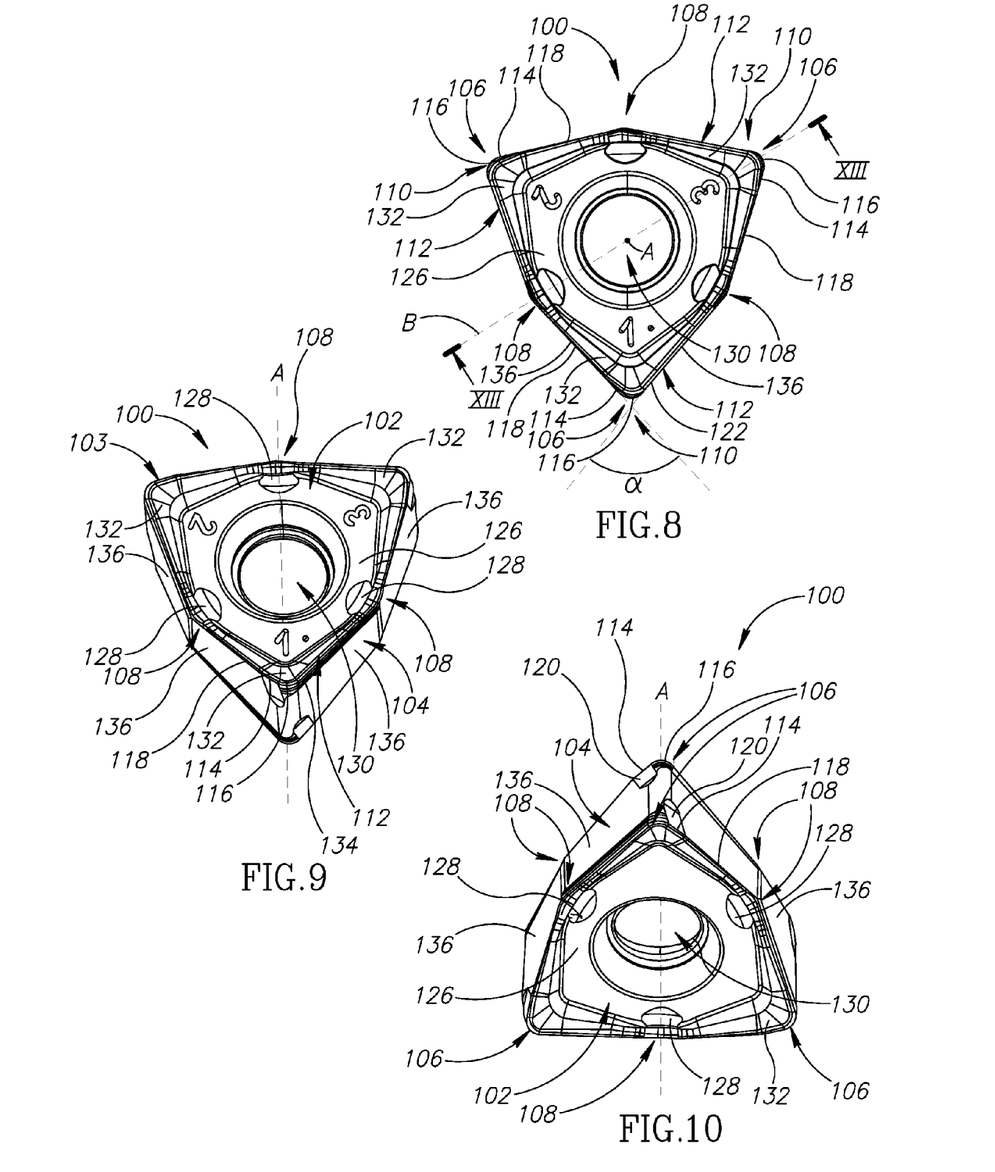
FIG. 8 is an end view of a cutting insert according to an embodiment of the present invention.
FIG. 9 is a first perspective view of the cutting insert of FIG. 8.
FIG. 10 is a second perspective view of the cutting insert of FIG. 8.

FIG. 13 depicts a cross section view of the cutting insert 100 taken along the cutting line XIII-XIII noted in FIG. 8, passing through one of the primary apexes 106 and the opposite secondary apex 108. Each end surface 102 has three spaced apart abutment recesses 128, each formed adjacent to one of the secondary apexes 108, between the secondary apex 108 and the insert axis A (i.e., arranged symmetrically about the insert axis A).

Each cutting portion 110 of the cutting insert 100 includes a rake surface 132 extending along the respective first, second, tip and ramping cutting edges 112, 114, 116, 118, and sloping obliquely towards the mid-plane P. The rake surface 132 is the surface over which the chips removed from the work piece slide. In particular, the rake surface 132 extends along the major portion 122 and the curved portion 124 of the first cutting edge 112, as well as along the ramping cutting edge 118 of the same cutting portion 110. Each abutment recesses 128 is located adjacent a respective curved portion 124, allowing metal chips removed by the curved portion 124, to flow thereon, thereby enabling better chip flow of the cutting portion 110.

The cutting insert 100 is retained in the respective insert pocket 154, with the insert abutment surface 126 abutting against (i.e., received by) the pocket abutment surface 156. The side flanks 136 of the cutting insert 100 abut against (i.e., received by) the clamping walls 158 of the insert pocket 154. The clamping walls 158 may be planar surfaces forming an acute angle with the plane of the pocket abutment surface 156. This would ensure contact with the side flanks 136 of the cutting insert 100 in a predetermined desired location.

In order to ensure a tight abutment between the insert abutment surface 126 and the pocket abutment surface 156, each pocket abutment surface 156 has three spaced apart pocket recesses 160 formed therein, spaced apart from the fastening hole 162. As seen in FIG. 6, the pocket recesses 160 are also spaced from an exterior peripheral surface 153 of the tool body 152. When the cutting insert 100 is placed in the insert pocket 154, each pocket recess 160 overlaps, at least partially, with one of the abutment recesses 128 of the cutting insert 100. This recess-to-recess overlap positioning forms three voids, resulting in three separate abutment regions between the insert abutment surface 126 and the pocket abutment surface 156, ensuring tight abutment therebetween.

Figure 1:
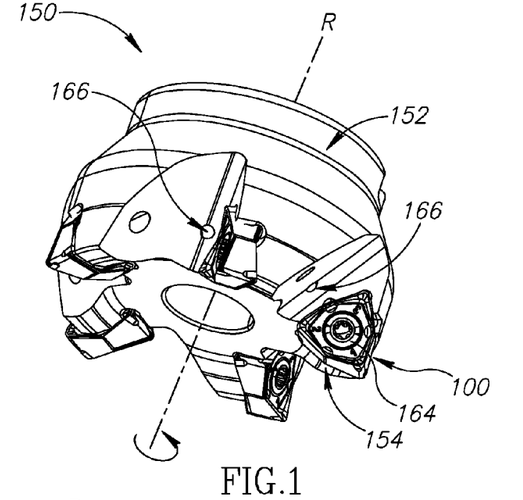
FIG. 1 is a perspective view of a cutting tool according to an embodiment of the present invention.
Figure 2:
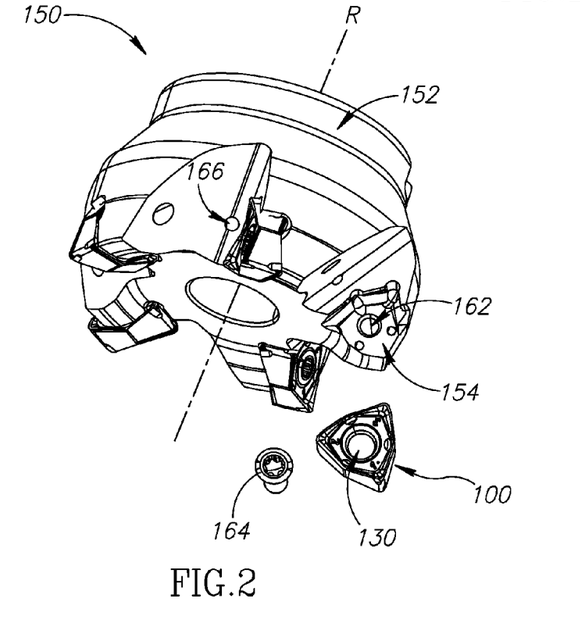
FIG. 2 is a perspective view of the cutting tool of FIG. 1, partially disassembled.
Figure 3:
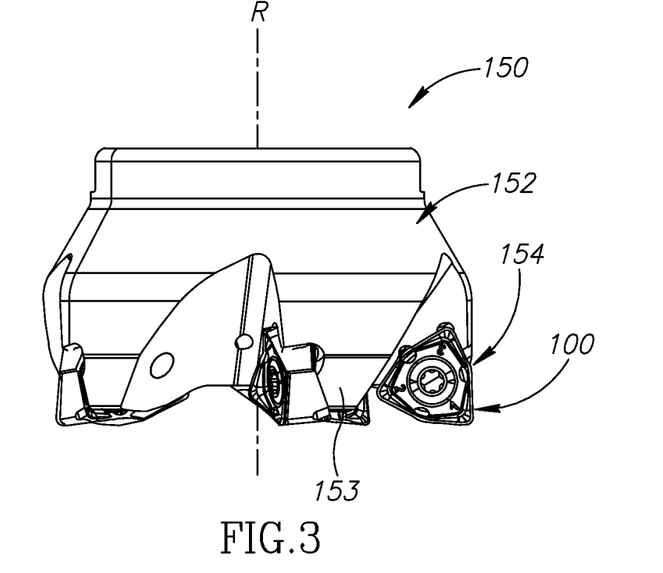
FIG. 3 is a side view of the cutting tool of FIG. 1.
Figure 4:
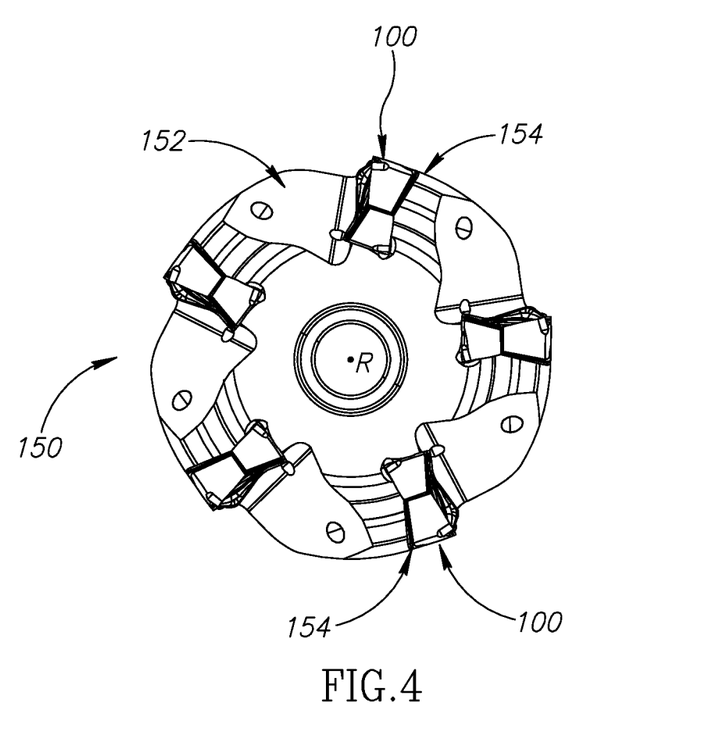
FIG. 4 is a bottom view of the cutting tool of FIG. 1.

As depicted in FIGS. 1, 3 and 5, when the cutting insert 100 is mounted in the insert pocket 154, one of the cutting portions 110 (i.e., the operative cutting portion 110) extends outwards of the circumference of the tool body 152, thus being ready to be employed in a metal cutting operation. A plurality of coolant channels are formed through the tool body 152, each coolant channel opening out at a coolant outlet 166 towards one of the insert pockets 154. In this manner, coolant fluid supplied through the coolant channels may be sprayed out towards the operative cutting portion 110.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A double sided indexable cutting insert (100) having a central insert axis (A) extending perpendicular to an insert mid-plane (P), and comprising:
    two end surfaces (102) and a peripheral surface (104) extending therebetween, the end surfaces (102) located on opposite sides of the mid-plane (P), each end surface (102) having three primary apexes (106) and three secondary apexes (108); and
    six cutting portions (110), each formed along the intersection of the peripheral surface (104) and one of the end surfaces (102), each cutting portion (110) comprising a first cutting edge (112) and a second cutting edge (114) extending transversely to the first cutting edge (112), and a tip cutting edge (116) extending therebetween at one of the primary apexes (106);
    wherein:
    the peripheral surface (104) has a plurality of clearance surfaces (120), each extending from one of the second cutting edges (114) in the direction of the mid-plane (P),
    each of the first cutting edges (112) has a major portion (122) extending from the respective tip cutting edge (116) towards the mid-plane (P), and a curved portion (124) extending from the major portion (122) and curving away from the mid-plane (P),
    each end surface (102) has an insert abutment surface (126) on an abutment plane (AP), the abutment planes (AP) being parallel to the mid-plane (P) and equidistant therefrom, and
    each of the curved portions (124) lies between an adjacent abutment plane (AP) and an adjacent primary apex (106), in a direction parallel to the central insert axis (A).

2. The double sided indexable cutting insert (100) according to claim 1, wherein each of the end surfaces (102) has three abutment recesses (128), each formed adjacent one of the secondary apexes (108), between the secondary apex (108) and the insert axis (A).

3. The double sided indexable cutting insert (100) according to claim 1, wherein the peripheral surface (104) has a plurality of side flanks (136), each extending between a pair of primary apexes (106) located on opposite sides of the mid-plane (P), and an adjacent pair of secondary apexes (108) located on opposite sides of the mid-plane (P), and at each primary apex (106), each pair of side flanks (136) forms a first acute angle ($\alpha$) therebetween.

4. The double sided indexable cutting insert (100) according to claim 3, wherein the first acute angle ($\alpha$) is in the range of 82°-86°.

5. The double sided indexable cutting insert (100) according to claim 3, wherein the first acute angle ($\alpha$) is an 84° angle.

6. The double sided indexable cutting insert (100) according to claim 3, wherein the side flanks (136) are planar and parallel to the insert axis (A).

7. The double sided indexable cutting insert (100) according to claim 1, wherein each of the major portions (122) forms a second acute angle ($\beta$) with the mid-plane (P), in a side view of the cutting insert (100) taken along the mid-plane (P) and along a bisector (B) and viewed from the secondary apex (108).

8. The double sided indexable cutting insert (100) according to claim 1, wherein each cutting portion (110) further comprises a ramping cutting edge (118) extending from the second cutting edge (114) towards the curved portion (124) of an adjacent cutting portion (110).

9. The double sided indexable cutting insert (100) according to claim 8, wherein the ramping cutting edge (118) forms a third acute angle ($\gamma$) with the mid-plane (P) in a side view of the cutting insert (100) taken along the mid-plane (P) and along a bisector (B) and viewed from the secondary apex (108).

10. The double sided indexable cutting insert (100) according to claim 1, wherein in each cutting portion (110), the major portion (122) of the first cutting edge (112) is longer than the second cutting edge (114).

11. The double sided indexable cutting insert (100) according to claim 1, further comprising a clamping hole (130) extending along the insert axis (A), and opening out at least to one of the end surfaces (102).

12. The double sided indexable cutting insert (100) according to claim 11, wherein the clamping hole (130) opens out to both of the end surfaces (102).

13. The double sided indexable cutting insert (100) according to claim 1, wherein each cutting portion (110) includes a rake surface (132) extending along the respective first cutting edge (112), second cutting edge (114), and tip cutting edge (116), obliquely towards the mid-plane (P).

14. The double sided indexable cutting insert (100) according to claim 13, wherein each rake surface (132) also extends along a respective ramping cutting edge (118) extending from the second cutting edge (114) towards the curved portion (124) of an adjacent cutting portion (110).

15. The double sided indexable cutting insert (100) according to claim 1, wherein the peripheral surface (104) has a plurality of relief surfaces (134), each extending along one of the cutting portions (110), from the first cutting edge (112) and the tip cutting edge (116) towards the mid-plane (P).

16. The double sided indexable cutting insert (100) according to claim 1, wherein in each cutting portion (110), the major portion (122) is substantially perpendicular to the second cutting edge (114).

17. A cutting tool (150) having a rotation axis (R), and comprising:
    a tool body (152) having a plurality of insert pockets (154) formed on the periphery thereof arranged symmetrically about the rotation axis (R); and
    a plurality of cutting inserts (100) according to claim 1, retained in the insert pockets (154).

18. The cutting tool (150) according to claim 17, wherein:
the peripheral surface (104) of each cutting insert (100) has a plurality of side flanks (136), each extending between a pair of primary apexes (106) located on opposite sides of the mid-plane (P), and an adjacent pair of secondary apexes (108) located on opposite sides of the mid-plane (P), and
each insert pocket (154) comprises a pocket abutment surface (156) for receiving one of the insert abutment surfaces (126) of the cutting insert (100), and a plurality of clamping walls (158) extending transversely to the pocket abutment surface (156), for receiving the side flanks (136) of the cutting insert (100).

19. The cutting tool (150) according to claim 17, wherein:
each of the end surfaces (102) of the cutting insert (100) has three abutment recesses (128), each formed adjacent one of the secondary apexes (108), between the secondary apex (108) and the insert axis (A), and
each pocket abutment surface (156) has three spaced apart pocket recesses (160) formed therein, each pocket recess (160) at least partially overlapping with one of the abutment recesses (128).

20. The cutting tool (150) according to claim 17, wherein a pocket fastening hole (162) opens out to a pocket abutment surface (156) of each insert pocket (154), and a clamping member (164) passes through a clamping hole (130) of the cutting insert (100) and the fastening hole (162) of the insert pocket (154), to fasten the cutting insert (100) to the insert pocket (154).

21. The cutting tool (150) according to claim 17, wherein a plurality of coolant channels pass through the tool body (152), each coolant channel opening out at a coolant outlet (166) towards one of the insert pockets (154).

22. A double sided indexable cutting insert (100) having a central insert axis (A) extending perpendicular to an insert mid-plane (P), and comprising:
two end surfaces (102) and a peripheral surface (104) extending therebetween, the end surfaces (102) located on opposite sides of the mid-plane (P), each end surface (102) having three primary apexes (106) and three secondary apexes (108); and
six cutting portions (110), each formed along the intersection of the peripheral surface (104) and one of the end surfaces (102), each cutting portion (110) comprising a first cutting edge (112) and a second cutting edge (114) extending transversely to the first cutting edge (112), and a tip cutting edge (116) extending therebetween, the tip cutting edge (116) corresponding to a respective primary apex (106);
wherein:
each end surface (102) has an insert abutment surface (126) on an abutment plane (AP), the abutment planes (AP) being parallel to the mid-plane (P) and spaced apart therefrom by a first distance (D1),
the primary apexes (106) on each end surface (102) define a tip plane (TP) which is parallel to an associated adjacent abutment plane (AP) and spaced apart therefrom by a second distance (D2);
the secondary apexes (108) on each end surface (102) define a corner plane (CP) parallel to an associated adjacent abutment plane (AP) and spaced apart therefrom by a third distance (D3), with the third distance (D3) being smaller than the second distance (D2);
the tip plane (TP) and the corner plane (CP) are both on the same side of their associated abutment plane (AP); and
a ratio of the third distance (D3) to the second distance (D2) is between 0.04 and 0.1.

23. A cutting tool (150) having a rotation axis (R), and comprising:
a tool body (152) having a plurality of insert pockets (154) formed on the periphery thereof arranged symmetrically about the rotation axis (R), each insert pocket (154) having a pocket abutment surface (156) with a plurality of spaced apart pocket recesses (160), and a plurality of clamping walls (158) extending transversely to the pocket abutment surface (156); and
a plurality of cutting inserts (100) in accordance with claim 22 retained in the insert pockets (154), the peripheral surface (104) of each cutting insert having a plurality of side flanks (136), and each insert abutment surface (126) having a plurality of spaced apart abutment recesses (128), wherein:
the side flanks (136) of the cutting insert (100) abut the respective clamping walls (158), and one of the insert abutment surfaces (126) of each cutting insert (100) abuts the respective pocket abutment surface (156) with each pocket recess (160) at least partially overlapping with one of the abutment recesses (128).

* * * * *